United States Patent
Sulemanji et al.

(10) Patent No.: US 9,963,620 B2
(45) Date of Patent: May 8, 2018

(54) HIGH PERFORMANCE ENVIRONMENTALLY FRIENDLY SEALANT COMPOSITION FOR TIRE REPAIR

(71) Applicant: Illinois Tool Works Inc., Glenview, IL (US)

(72) Inventors: Shees N. Sulemanji, Grover Beach, CA (US); Brandt A. Haener, Los Osos, CA (US); Bryan Douglas Smith, Arroyo Grande, CA (US); Martin Patrick Spindler, Herdwangen-Schonach (DE); Henry Friedrich Ferdinand Klemm, Ueberlingen (DE); Gordon Chetosky, Hinsdale, IL (US)

(73) Assignee: Illinois Tool Works Inc., Glenview, IL (US)

( * ) Notice: Subject to any disclaimer, the term of this patent is extended or adjusted under 35 U.S.C. 154(b) by 25 days.

(21) Appl. No.: 15/057,015

(22) Filed: Feb. 29, 2016

(65) Prior Publication Data

US 2016/0289509 A1   Oct. 6, 2016

Related U.S. Application Data

(60) Provisional application No. 62/141,377, filed on Apr. 1, 2015.

(51) Int. Cl.
```
C09J 107/02    (2006.01)
B29C 73/16     (2006.01)
C08K 3/22      (2006.01)
C08K 3/26      (2006.01)
C08K 3/30      (2006.01)
C08K 3/36      (2006.01)
C08K 5/053     (2006.01)
```

(52) U.S. Cl.
CPC .......... *C09J 107/02* (2013.01); *B29C 73/163* (2013.01); *C08K 3/22* (2013.01); *C08K 3/26* (2013.01); *C08K 3/30* (2013.01); *C08K 3/36* (2013.01); *C08K 5/053* (2013.01); *C08K 2003/2227* (2013.01); *C08K 2003/2241* (2013.01); *C08K 2003/265* (2013.01); *C08K 2003/3045* (2013.01)

(58) Field of Classification Search
CPC .. C09J 107/02; C08K 2003/2241; C08K 3/22; C08K 2003/3045; C08K 2003/265; C08K 3/36; C08K 3/30; C08K 3/26; C08K 2003/2227; C08K 5/053; B29C 73/163

USPC .......................................................... 523/166
See application file for complete search history.

(56) References Cited

U.S. PATENT DOCUMENTS

| | | | |
|---|---|---|---|
| 5,371,136 A | 12/1994 | Brooks et al. | |
| 5,569,740 A * | 10/1996 | Tanaka | B01D 61/145 210/650 |
| 5,856,376 A | 1/1999 | Wong | |
| 6,864,305 B2 * | 3/2005 | Kishida | B29C 73/163 523/166 |
| 2004/0048962 A1 | 3/2004 | Kojima et al. | |
| 2007/0225405 A1* | 9/2007 | Cegelski | B29C 73/163 523/166 |
| 2012/0125235 A1 | 5/2012 | Azeyanagi et al. | |

FOREIGN PATENT DOCUMENTS

| | | |
|---|---|---|
| EP | 0 972 616 B1 | 1/2000 |
| EP | 0 988 960 A2 | 3/2000 |
| EP | 1 372 941 B1 | 1/2004 |
| EP | 2719665 A1 | 4/2014 |
| FR | 1 016 016 | 10/1952 |
| JP | 06056903 A * | 3/1994 |
| JP | 2003-82327 | 3/2003 |
| JP | 2003-193029 | 7/2003 |
| JP | 2005120273 A * | 5/2005 |
| WO | WO 2007/112010 | 10/2007 |
| WO | WO 2012085869 A1 * | 6/2012 ........... B29C 73/163 |

OTHER PUBLICATIONS

JP 06-056903 A (1994), machine translation, JPO Japan Platform for Patent Information (J-PlatPat).*
JP 2005-120273 A (2005), machine translation, JPO Japan Platform for Patent Information (J-PlatPat).*

* cited by examiner

*Primary Examiner* — Josephine L Chang
(74) *Attorney, Agent, or Firm* — Maxwell J. Petersen; Lewis, Brisbois, Bisgaard & Smith LLP

(57) ABSTRACT

An environmentally friendly puncture sealing composition is provided which includes natural rubber latex, suitably high filtered natural rubber latex having a controlled particle size, and an aqueous antifreeze agent that includes water, glycerin and propylene glycol. The aqueous antifreeze agent has a viscosity profile similar to common ethylene glycol-based antifreeze agents, but is free of ethylene glycol. The puncture sealing composition avoids the environmental hazards of ethylene glycol, and is effective at temperatures of −30° C. and lower.

20 Claims, No Drawings

HIGH PERFORMANCE ENVIRONMENTALLY FRIENDLY SEALANT COMPOSITION FOR TIRE REPAIR

RELATED APPLICATIONS

This patent application claims priority to U.S. Provisional application 62/141,377, filed on Apr. 1, 2015.

FIELD OF THE INVENTION

This invention is directed to an environmentally friendly sealing composition for repairing punctures in tires.

BACKGROUND OF THE INVENTION

Various known tire sealants contain ethylene glycol as an antifreeze agent. Antifreeze agents are needed in order for the sealants to be effective at cold winter temperatures, sometimes approaching −30° C. or lower. However, ethylene glycol is toxic to the environment.

Various improved tire sealants use other organic antifreeze agents that are environmentally safer than ethylene glycol. U.S. Pat. Nos. 7,388,041 and 7,868,061, both to Cegeiski et al., disclose a puncture sealing composition that includes at least a rubber latex and an antifreeze agent. The antifreeze agent can be glycerin, potassium acetate, or a solution of glycerin and potassium acetate, suitably mixed with water. U.S. Pat. No. 8,772,370, issued to Sulemanji, discloses a puncture sealing composition that includes at least a rubber latex and an aqueous antifreeze solution. The aqueous antifreeze solution includes an antifreeze agent selected from the group consisting of trimethyl glycerine, dimethyl sulfoxide, and combinations thereof.

While the known improved tire sealants have various advantages, they typically do not mimic the viscosity of tire sealants based on ethylene glycol, especially at very low temperatures. There is a need or desire for an environmentally friendly tire sealant composition whose viscosity profile is similar to that of tire sealants that contain ethylene glycol.

SUMMARY OF THE INVENTION

The present invention is directed to an improved puncture sealing agent for tire repair. The puncture sealing agent includes about 25-75% by weight of a natural rubber latex and about 25-75% by weight of an aqueous antifreeze solution. The natural rubber latex is suitably a highly filtered natural rubber latex that is substantially free of coagulants. The aqueous antifreeze solution includes by weight of the solution, about 10-50% by weight water, about 20-60% by weight glycerin, and about 20-60% by weight propylene glycol.

The aqueous antifreeze solution is designed to have a viscosity profile that is similar to the viscosity of known ethylene glycol-based antifreeze solutions. By eliminating ethylene glycol, the aqueous antifreeze solution is more environmentally friendly than ethylene glycol-based antifreeze solutions. Due to the desirable viscosity profile of the aqueous antifreeze solution, the puncture sealing agent is effective at temperatures of −30° C. and lower.

The highly filtered natural rubber latex can be filtered by passing it through a mesh filter to remove coagulants, and suitably to provide an average particle size of about 400 microns or less. This enables the environmentally friendly puncture sealing agent to be injected through a valve stem of a tire without removing the core and seal. The combination of ingredients also provides a highly effective sealing of tire punctures notwithstanding the relatively low viscosity of the sealant.

With the foregoing in mind, it is a feature and advantage of the invention to provide an environmentally friendly, high performance sealant for tire repair that is easy to inject and is effective across a wide range of use temperatures.

DETAILED DESCRIPTION OF THE INVENTION

The environmentally friendly puncture sealing composition of the invention includes about 25-75% by weight of a natural rubber latex, suitably about 30-70% by weight, or about 35-65% by weight, or about 40-60% by weight, or about 45-55% by weight. The natural rubber latex should be substantially free of coagulants, and suitably has an average particle size of about 400 microns or less. This can be accomplished by preparing a highly filtered natural rubber latex by filtering the natural rubber latex through a mesh screen. The mesh screen can have openings of about 300-500 microns, suitably about 400 microns. Pumping the natural rubber latex through the mesh screen places the natural rubber latex in a fine, free-flowing state that enables passage through the valve stem of a tire without removing the core and seal. The highly filtered natural rubber latex can also be biodegradable.

The natural rubber latex can, in one embodiment, include about 55-65% by weight natural rubber, up to about 0.25% by weight ammonia, and a balance substantially of water. One suitable natural rubber latex, which is highly filtered as described above, is sold by Centrotrade Rubber, Inc. under the name CENTEX HF. CENTEX HF has a total solid content of about 61-63% by weight, a dry natural rubber content of about 59-61% by weight, an ammonia content of about 0.60-0.80% by weight, and a balance substantially of water and is biodegradable.

The environmentally friendly puncture sealing composition of the invention includes about 25-75% by weight of an aqueous antifreeze solution, suitably about 30-70% by weight, or about 35-65% by weight, or about 40-60% by weight, or about 45-55% by weight. The aqueous antifreeze solution includes about 10-50% by weight water, suitably about 15-35% by weight water; about 20-60% by weight glycerin, suitably about 30-45% by weight glycerin; and about 20-60% by weight propylene glycol, suitably about 30-45% by weight propylene glycol. The aqueous antifreeze solution is free of ethylene glycol, and the puncture sealing composition is free of ethylene glycol.

The environmentally friendly puncture sealing composition can optionally include an inorganic powder, suitably an ultra-fine inorganic powder having an average particle diameter of about 150 nanometers or less, or about 100 nanometers or less. The inorganic powder can be present at up to about 5% by weight of the puncture sealing composition, suitably about 0.5-2.5% by weight. Suitable inorganic powders include without limitation calcium carbonate, barium carbonate, silicon dioxide, titanium dioxide, calcium sulfate, barium sulfate, aluminum oxide, and the like. When present, the ultra-fine inorganic powder combines with the highly filtered natural rubber latex to facilitate the formation of a strong and long-lasting sealing and repair of the punctured tire. Also, because both the ultra-fine inorganic powder and the highly filtered natural rubber latex have a controlled particle size, the passage of the puncture sealing composition through the valve stem of the tire can still be accomplished without removing the core and seal.

EXAMPLE

An environmentally friendly puncture sealant composition was prepared by mixing the following ingredients together in the following percentages.

| Ingredient | Percent by Weight |
|---|---|
| Glycerin | 18.75 |
| Propylene Glycol | 18.75 |
| Deionized Water | 12.5 |
| Highly Filtered Natural Rubber Latex (CENTEX ® HF) | 50.0 |
| TOTAL | 100 |

Five batches of CENTEX® HF highly filtered natural latex rubber were tested for mechanical stability by the supplier. Stirring was applied to each batch of the highly filtered natural latex rubber at 14,000 rpm until latex instability was noted, evidenced by coagulation of a small amount (about 1%) of the natural latex rubber. The time, in seconds, was measured from the onset of stirring to the onset of coagulation.

Each of the five batches was converted into a tire sealant according to the above formulation. Each of the tire sealants was added to an OEM bottle used with an OEM compressor kit supplied by Illinois Tool Works Inc. for the purpose of injecting the tire sealant into a tire. The bottles of tire sealant were conditioned in an oven at 70° C. for 24 hours. The valve of the tire was also conditioned at 70° C. In each case, the tire sealant was injected through the valve stem without removing the core and seal.

The injection pressures were measured for each tire sealant. The maximum pressure was the initial pressure needed to start the injection process. The drop pressure was the pressure needed to sustain the injection process once it started. As shown in Table 1 below, higher mechanical stabilities of the highly filtered natural rubber latex, in excess of 1050 seconds, generally resulted in greater ease of injection, as demonstrated by lower injection pressures.

TABLE 1

| Mechanical Stabilities and Injection Pressures | | | |
|---|---|---|---|
| CENTEX ® HF Batch No. | Mechanical Stability, Sec. | Maximum Injection Pressure, psi | Drop Injection Pressure, psi |
| BFG 414 | 1085 | 38 | 15 |
| BRE 414 | 1275 | 38 | 15 |
| BHE 410 | 1023 | 80 | 60 |
| BYM 412 | 950 | Clogged the valve stem | Clogged the valve stem |
| BLC 414 | 960 | 67 | 22 |

The puncture sealing composition can be injected through the valve stem of a tire using the same equipment and techniques that are used for conventional puncture sealing compositions that contain ethylene glycol. The puncture sealing composition can be injected without removing the core and seal of the valve stem.

The embodiments of the invention described herein are presently preferred. Various modifications and improvements can be made without departing from the spirit and scope of the invention. The scope of the invention is defined by the appended claims, and all changes that fall within the meaning and range of equivalents are intended to be embraced therein.

We claim:

1. A puncture sealing composition, comprising:
   about 25 to about 75% by weight natural rubber latex having a mechanical stability in excess of about 1050 seconds; and
   about 25 to about 75% by weight of an aqueous antifreeze solution;
   wherein the aqueous antifreeze solution comprises, by weight of the solution, 15-50% water, about 20-60% glycerin, and about 20-60% propylene glycol.

2. The puncture sealing composition of claim 1, wherein the natural rubber latex is free of coagulants.

3. The puncture sealing composition of claim 2, wherein the natural rubber latex is highly filtered.

4. The puncture sealing composition of claim 1, wherein the natural rubber latex has an average particle size of about 400 microns or less.

5. The puncture sealing composition of claim 1, wherein the natural rubber latex comprises natural rubber and ammonia.

6. The puncture sealing composition of claim 1, wherein the puncture sealing composition comprises about 40 to about 60% by weight of the natural rubber latex and about 40 to about 60% by weight of the aqueous antifreeze solution.

7. The puncture sealing composition of claim 1, wherein the aqueous antifreeze solution comprises, by weight of the solution, 15-35% water, about 30-45% glycerin, and about 30-45% propylene glycol.

8. A puncture sealing composition, comprising:
   about 35 to about 65% by weight natural rubber latex having a mechanical stability in excess of about 1050 seconds; and
   about 35 to about 65% by weight of an aqueous antifreeze solution;
   wherein the aqueous antifreeze solution comprises, by weight of the solution, 15-35% water, about 30-45% glycerin, and about 30-45% propylene glycol.

9. The puncture sealing composition of claim 8, wherein the natural rubber latex is free of coagulants.

10. The puncture sealing composition of claim 8, wherein the natural rubber latex is highly filtered.

11. The puncture sealing composition of claim 8, wherein the natural rubber latex has a particle size of about 400 microns or less.

12. The puncture sealing composition of claim 8, wherein the natural rubber latex comprises about 55-65% by weight natural rubber, up to about 0.25% by weight ammonia, and a balance of water.

13. The puncture sealing composition of claim 8, wherein the puncture sealing composition comprises about 45 to about 55% by weight of the natural rubber latex and about 45 to about 55% by weigh of the aqueous antifreeze solution.

14. The puncture sealing composition of claim 13, wherein the natural rubber latex has an average particle size of about 400 microns or less.

15. A puncture sealing composition, comprising:
   about 35 to about 65% by weight of a highly filtered natural rubber latex that is free of coagulants and having a mechanical stability in excess of about 1050 seconds; and about 35 to about 65% by weight of an aqueous antifreeze solution;

wherein the natural rubber latex comprises by weight of the latex, about 55-65% natural rubber, less than about 0.25% ammonia, and a balance of water;

and the aqueous antifreeze solution comprises, by weight of the solution, 15-35% water, about 30-45% glycerin, and about 30-45% propylene glycol.

16. The puncture sealing composition of claim 15, wherein the puncture sealing composition comprises about 45 to about 55% by weight of the natural rubber latex and about 45 to about 55% by weight of the aqueous antifreeze solution.

17. The puncture sealing composition of claim 15, further comprising an inorganic powder.

18. The puncture sealing composition of claim 17, wherein the inorganic powder has an average particle diameter of about 150 nanometers or less.

19. The puncture sealing composition of claim 17, wherein the inorganic powder is selected from the group consisting of calcium carbonate, barium carbonate, silicon dioxide, titanium dioxide, calcium sulfate, barium sulfate, aluminum oxide, and combinations thereof.

20. The puncture sealing composition of claim 17, comprising about 0.5-2.5% by weight of the inorganic powder.

* * * * *